United States Patent
Chamarty et al.

(10) Patent No.: US 11,188,472 B2
(45) Date of Patent: Nov. 30, 2021

(54) CACHING STREAMS OF MEMORY REQUESTS

(71) Applicant: Google LLC, Mountain View, CA (US)

(72) Inventors: Vinod Chamarty, Sunnyvale, CA (US); Joao Dias, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/774,595

(22) Filed: Jan. 28, 2020

(65) Prior Publication Data

US 2020/0257631 A1    Aug. 13, 2020

Related U.S. Application Data

(60) Provisional application No. 62/805,167, filed on Feb. 13, 2019.

(51) Int. Cl.
| | |
|---|---|
| G06F 12/08 | (2016.01) |
| G06F 12/0882 | (2016.01) |
| G06F 9/54 | (2006.01) |
| G06F 12/02 | (2006.01) |
| G06F 12/0871 | (2016.01) |
| G06F 12/0891 | (2016.01) |

(52) U.S. Cl.
CPC .......... *G06F 12/0882* (2013.01); *G06F 9/544* (2013.01); *G06F 12/0292* (2013.01); *G06F 12/0871* (2013.01); *G06F 12/0891* (2013.01)

(58) Field of Classification Search
CPC .. G06F 12/0882; G06F 9/544; G06F 12/0292; G06F 12/0871; G06F 12/0891
USPC .......................................................... 711/154
See application file for complete search history.

(56) References Cited

U.S. PATENT DOCUMENTS

| | | | |
|---|---|---|---|
| 7,370,174 B2 | 5/2008 | Arizpe et al. | |
| 9,229,892 B2 | 1/2016 | Mandapuram et al. | |
| 9,430,392 B2 | 8/2016 | Jain et al. | |
| 9,652,405 B1 * | 5/2017 | Shain | G06F 11/1441 |
| 9,703,493 B2 | 7/2017 | Alavoine | |
| 9,880,940 B2 | 1/2018 | Kim et al. | |
| 2006/0282645 A1 | 12/2006 | Tsien | |

(Continued)

OTHER PUBLICATIONS

No Author [Book], "Arm CoreLink MMU-600 System Memory Management Unit—Technical Reference Manual", Arm Limited, 2016, 129 pages.

(Continued)

*Primary Examiner* — Hua J Song

(74) *Attorney, Agent, or Firm* — Fish & Richardson P.C.

(57) ABSTRACT

Methods, systems, and apparatus, including computer programs encoded on computer storage media, for allocating cache resources according to page-level attribute values. In one implementation, the system includes one or more integrated client devices and a cache. Each client device is configured to generate at least a memory request. Each memory request has a respective physical address and a respective page descriptor of a page to which the physical address belongs. The cache is configured to cache memory requests for each of the one or more integrated client devices. The cache comprises a cache memory having multiple ways. The cache is configured to distinguish different memory requests using page-level attributes of respective page descriptors of the memory requests, and to allocate different portions of the cache memory to different respective memory requests.

20 Claims, 4 Drawing Sheets

(56) References Cited

U.S. PATENT DOCUMENTS

| | | |
|---|---|---|
| 2016/0170910 A1 | 6/2016 | Inamdar et al. |
| 2016/0335187 A1* | 11/2016 | Greenspan ............ G06F 12/128 |
| 2017/0220466 A1 | 8/2017 | Gupta et al. |
| 2017/0286318 A1 | 10/2017 | Brannock et al. |
| 2017/0371809 A1 | 12/2017 | Benedict |
| 2018/0074961 A1* | 3/2018 | Greenspan .......... G06F 12/0851 |
| 2018/0121242 A1 | 5/2018 | Zhang |

OTHER PUBLICATIONS

PCT International Search Report and Written Opinion in International Application No. PCT/US2020/015433, dated Jun. 4, 2020, 12 pages.

TW Office Action in Taiwan Application No. 109104306, dated Feb. 24, 2021, 14 pages (with English translation).

\* cited by examiner

CACHING STREAMS OF MEMORY REQUESTS

CROSS-REFERENCE TO RELATED APPLICATION

This application claims priority to U.S. Provisional Application No. 62/805,167, filed on Feb. 13, 2019, entitled "Caching Streams of Memory Requests," the entirety of which is hereby incorporated by reference.

BACKGROUND

This specification relates to systems having integrated circuit devices.

A cache is a device that stores data retrieved from memory or data to be written to memory for one or more different hardware devices in a system. The hardware devices can be different components integrated into a system on a chip (SOC). In this specification, the devices that provide read requests and write requests through caches will be referred to as client devices.

Caches can be used to reduce power consumption by reducing overall requests to main memory. In addition, as long as client devices can access the data they need in the cache, power can further be saved by placing the main memory as well as data paths to the main memory in a low-power state. Therefore, cache usage is correlated with overall power consumption, and increasing cache usage results in a decrease in overall power consumption. Therefore, devices that rely on battery power, e.g., mobile computing devices, can extend their battery life by increasing cache usage for the integrated client devices.

Caches are commonly organized into multiple sets having multiple ways. The memory address of a request is used to identify a particular set to place the cache line, and if an existing cache line has to be replaced, a particular caching policy determines which of the ways within the set should be replaced. For example, a cache can implement a caching policy by which the least-recently used cache line within a set gets replaced first.

Caches are generally low-level hardware devices that do not have visibility into the interpretation of the addresses that are being cached. In other words, traditional caches have no mechanism for determining what the address is being used for or what type of data is being stored at the address. This can lead to inefficient caching performance because sets of unrelated data requests can compete for the same cache resources, which leads to fewer cache hits and more cache misses and more resulting trips to memory.

SUMMARY

This specification describes techniques for implementing a caching policy in a cache that is driven by related streams of data, also referred to as "data streams," herein. In this specification, a stream is a plurality of memory requests that are related to each other in software. For example, a stream can include all requests for instructions for the same software driver. A stream can also include all requests for data for the same software driver.

A cache can identify streams of data by inspecting page-level attributes that different memory requests have in common. The cache can then allocate different portions of the cache memory to different data streams. Therefore, for example, requests for instructions can be allocated to different portions of the cache than requests for data. This capability allows a cache to allocate cache portions based on properties of the data rather than solely on address ranges, page identifiers, or the identity of the requesting client device or client driver.

Particular embodiments of the subject matter described in this specification can be implemented so as to realize one or more of the following advantages. A cache can increase the performance and utilization of the cache by using page-level attributes to determine related streams of memory requests. Therefore, the cache can reduce competition for cache resources for different streams of memory requests, which increases the cache hit rate. Increasing the cache hit rate decreases power consumption and extends battery life in mobile devices that rely on battery power. In addition, by using page-level attributes, a cache can allocate the same portion of the cache to client devices having a producer/consumer relationship, which effectively increases the amount of cache resources available to the system as a whole.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
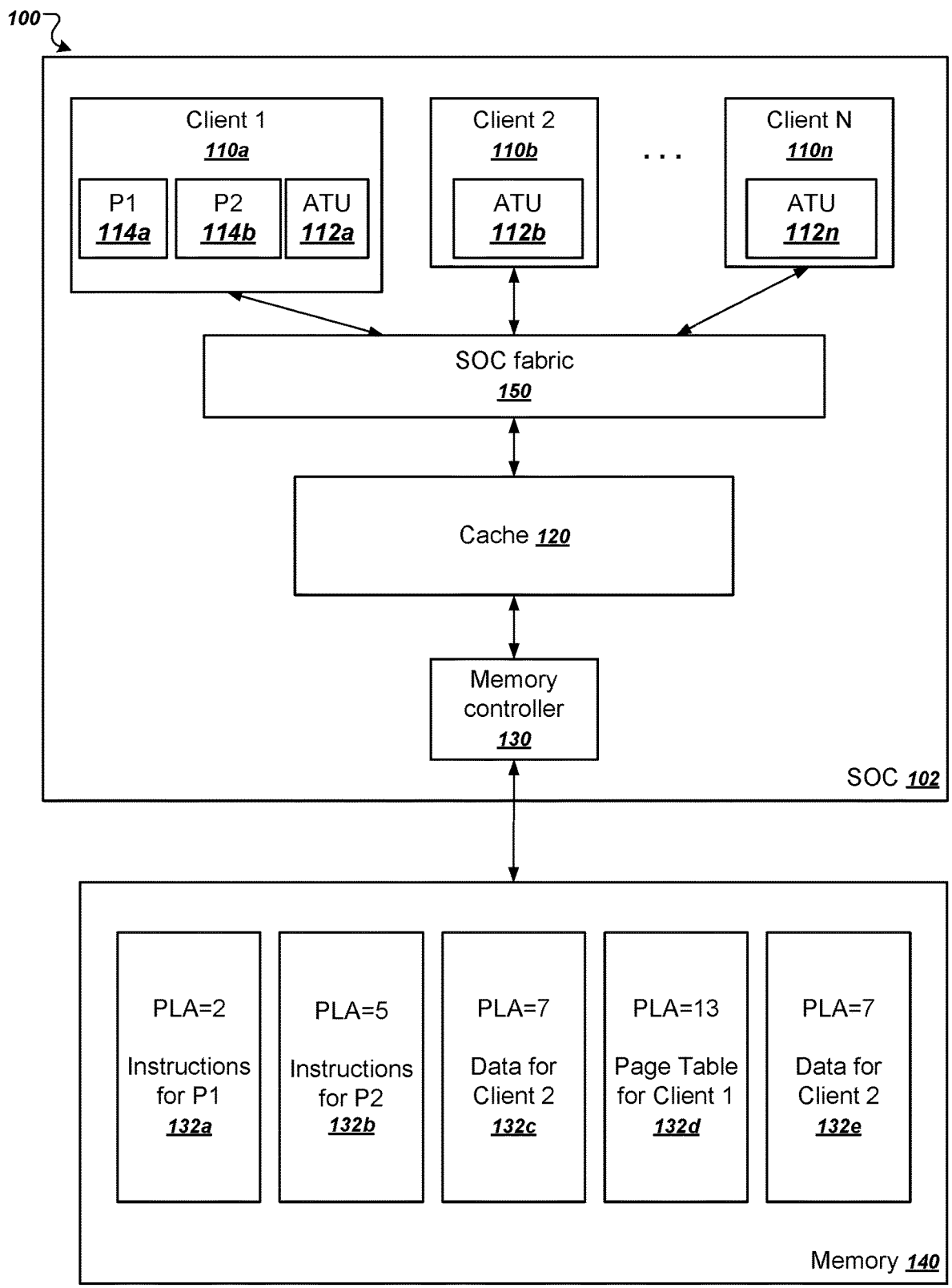
FIG. 1 illustrates a block diagram of an example system according to implementations of the present disclosure.

FIG. 1 is a diagram of an example system 100. The system 100 includes a system on a chip (SOC) 102 communicatively coupled to a memory device 140. The SOC 102 has a number of client devices 110a, 110b, through 110n that use a cache 120 that is arranged in the data path to memory 140. In this example, because the cache 120 caches data requests for multiple client devices in a single SOC 102, the cache 120 may be referred to as a system-level cache. However, the same techniques described below can also be used for other caches that cache memory requests for only a single client device or software driver.

The SOC 102 is an example of a device that can be installed on or integrated into any appropriate computing device, which may be referred to as a host device. Because the techniques described in this specification are particularly suited to saving power consumption for the host device, the SOC 102 can be particularly beneficial when installed on a mobile host devices that rely on battery power, e.g., a smart phone, a smart watch or another wearable computing device, a tablet computer, or a laptop computer, to name just a few examples.

The cache 120 is an example of a cache that can implement a caching policy that allocates cache resources by identifying different streams of memory requests passing through the cache 120. For example, a first cache portion and a second cache portion of the cache 120 can be allocated to two different streams respectively. The example SOC 102 is illustrated as having one system-level cache 120. However, an SOC may have multiple caches, which each may or may not be a system-level cache.

The SOC 102 has multiple client devices 110a-n. Each of the client devices 110a-n can be any appropriate module, device, or functional component that is configured to read and store data in the memory device 140 through the SOC fabric 150. For example, a client device can be a CPU, an application-specific integrated circuit or lower-level components of the SOC 102 itself that are each capable of initiating communications through the SOC fabric 150.

Each client device 110a-n includes a respective address translation unit (ATU), e.g., the ATUs 112a-n. The ATUs 112a-n are responsible for translating virtual addresses provided by processes executing on the client devices to physical addresses in the memory device 140 where respective data has been or will be stored. In some implementations, one or more of the ATUs 112a-n are implemented as memory management units that are configured to perform address translation using a hardware-implemented walk of a page table that stores virtual-to-physical address translations.

Regardless of the implementation, when an ATU 112a-n receives a memory request, the ATU performs the address translation and generates a memory request having a resulting physical address as well as a page descriptor of a page in memory to which the physical address belongs. As part of this process, each ATU 112a-n can be configured to populate the page descriptor with a page-level attribute of the page in memory to which the physical address belongs.

A page descriptor can have values of multiple attributes that relate to various aspects of a virtual memory system. For example, the page descriptor can specify table-level attributes that relate to the page table itself, page-level attributes that relate to individual pages, and address-level attributes that relate to individual physical or virtual addresses. Thus, a page-level attribute value can be a subset of a page descriptor generated by an ATU and included with a memory request. A page-level attribute can be a page-based hardware attribute of the page descriptor. Each page-level attribute value specifies a value for an attribute that is specific to a page to which the physical address belongs.

The values of the page-level attributes can be assigned by software drivers of the client devices 110a-n. For example, when software drivers executing for the client devices request the allocation of pages in the memory 140, the software drivers can instruct the ATUs to assign particular page-level attributes to those pages. Each client device can execute one or more processes, e.g. processes 114a-b, and each process can assign its own page-level attributes as part of the memory allocation requests. The processes then generate virtual addresses to be converted by a respective ATU, and the respective ATU will translate the virtual address into a physical address and also surface the previously assigned page-level attribute in generating a memory request.

For example, FIG. 1 illustrates the memory 140 as having a number of allocated pages 132a, 132b, 132c, 132d, and 132e. Each of the pages has been assigned a respective page-level attribute value by a particular software driver that allocated the page in the memory 140. For example, the memory 140 has a page of instructions 132a for the first process 114a as well as a page of instructions 132b for the second process 114b executing on the first client device 110a. The memory 140 also has two pages of data 132c and 132e for the second client 110b. And the memory 140 has a page table page 132d for the first client 110a.

From this example, the cache 120 can make a number of distinctions between these pages just by examining the assigned page-level attributes. For example, the cache 120 can distinguish between instructions for the first process 114a and the second process 114b. Therefore, the cache 120 can allocate different cache resources for memory requests to these pages so that the two processes do not compete with one another for cache resources.

In addition, the cache 120 can determine that the two pages of data 132c and 132e belong to the same data stream by virtue of having the same page-level attribute value of 7. Therefore, the cache 120 can allocate the same cache resources for memory requests to either of these pages.

Lastly, the cache 120 can distinguish between pages having instructions for processes on the first client 110a and pages having page table data for the ATU 112a by inspecting the page-level attributes of the pages 132a, 132b, and 132d.

The SOC fabric 150 is a communications subsystem of the SOC 102. The SOC fabric 150 includes communications pathways that allow the client devices 110a-n to communicate with one another as well as to make requests to read and write data using the memory device 140. The SOC fabric 150 can include any appropriate combination of communications hardware, e.g., buses or dedicated interconnect circuitry.

The system 100 also includes communications pathways that allow communication between the cache 120 and the memory controller 130 as well as inter-chip communications pathways that allow communication between the memory controller 130 and the memory device 140. In some implementations, the SOC 102 can save power by powering down one or more of the communications pathways. Alternatively or in addition, in some implementations the SOC 102 can power down the memory device 140 to further conserve power. As another example, the SOC 102 can enter a clock-shut-off mode in which respective clock circuits are powered down for one or more devices.

The cache 120 is positioned in the data pathway between the SOC fabric 150 and the memory controller 130. The memory controller 130 can handle requests to and from the memory device 140. Thus, requests from the client devices 110a-n to read from or write to the memory device 140 pass through the cache 120. For example, the client 110a can make a request to read from the memory device 140, which passes through the SOC fabric 150 to the cache 120. The cache 120 can handle the request before forwarding the request to the memory controller 130 for the memory device 140.

The cache 120 can cache read requests, write requests, or both from client devices 110a-n. The cache 120 can cache read requests from client devices by responding to the request with data stored in the cache data rather than fetching the data from the memory device 140. Similarly, the cache 120 can cache write requests from client devices by writing the new data in the cache rather than writing the new data to the memory device 140. The cache 120 can the perform a write-back at a later time to write the updated data to the memory device 140.

The cache 120 can have dedicated cache memory, which can be implemented using dedicated registers or high-speed random access memory. The cache 120 can implement a caching policy that allocates different portions, e.g., ways, of the cache memory to different respective streams of memory requests. Therefore, memory requests belonging to the same stream can be handled using the same allocated portion of cache memory. To do so, the cache 120 can inspect particular page-level attributes of page descriptors included in memory requests to determine which pages belong to the same streams of memory requests. This allows the cache 120 to determine that physical addresses belonging to different pages belong to the same stream of memory requests.

One example of these techniques includes allocating different portions of the cache to different processes executing on the same client device. For example, the cache 120 can inspect the page descriptors of incoming memory requests in order to determine that some of the requests relate to pages owned by the first process 114a and that some other requests relate to pages owned by the second process 114b. Thus, in order to prevent these two processes from competing with each other for cache resources, the cache 120 can allocate a first portion of the cache to the first process 114a executing on the client device 110a and can allocate a second portion of the cache to the second process 114b executing on the same client device.

Another example includes allocating different portions of the cache to different buffers. For example, when the SOC is a graphics processing unit (GPU), each client device can perform a different function in a graphics processing pipeline. Therefore, the different data streams can be identified for render buffers, texture buffers, and vertex buffers, to name just a few examples.

The cache 120 can also be configured to implement even more refined caching behavior. For example, if the first process 114a is a producer process whose data is consumed by the second process 114b, the cache 120 can inspect the page descriptors of incoming memory requests to determine that both the producer process and the consumer process are active. In that situation, the cache 120 can allocate a single portion of the cache to both processes and invalidate the cache lines whenever they are read. In some implementations, the cache applies this replacement policy only for consumer processes that do not perform speculative reads. This configuration can cause all the write requests from the producer process to result in cache hits and all the read requests from the consumer process to result in cache hits as well because invalidating all the cache lines when they are read means that the size of the cache occupied by the processes is not continually increasing. This in turn allows the cache 120 to allocate a smaller portion of the cache memory to the producer and consumer processes, which further increases caching performance by freeing up cache resources for use by other devices and processes. In addition, this caching behavior for producer-consumer processes saves power because the cache lines that are invalidated when they are read by a consumer process will never need to be written back to memory.

The cache 120 can handle memory requests from the SOC fabric 150 using a controller pipeline. The controller pipeline implements the cache logic for determining whether or not data exists in the cache or needs to be fetched from or written to memory. Thus, the controller pipeline can also provide transactions to the memory controller 130 when access to memory is required, e.g., on a cache miss.

The cache 120 can be configured by writing multiple different page-level attribute values. The attribute values can be written to reserved configuration registers of the cache 120, e.g., special function registers. The cache 120 can interpret the occurrence of a respective attribute value in the configuration registers as an indication that dedicated cache resources should be allocated for particular data streams, and that each attribute value in the configuration registers corresponds to a separate data streams that should be allocated a dedicated portion of the cache.

In some implementations, the attribute values can specify wildcard bits so that the cache 120 can match on attribute patterns instead of only on fully specified attribute values. An attribute pattern can include wildcard bits that match any value. For example, an attribute pattern may be XX10, where X can be either 1 or zero. Thus, the following bit sequences would all match the example attribute pattern: 0010, 1110, and 1010.

An allocation engine of the cache 120 can be configured to allocate portions of the cache using the attribute values written to the configuration space of the cache 120. For example, the allocation engine can allocate a first portion of the cache for memory requests having page-level attributes having a first attribute value and a second portion of the cache for memory requests having page-level attributes matching a second attribute value. The attribute values can be preloaded onto the cache 120 at manufacturing time or can be dynamically created while servicing memory requests.

The allocation engine can generate a final cache configuration that the controller pipeline uses to service memory requests from the SOC fabric 150. In particular, the final cache configuration can specify which ways of the cache memory are allocated to which streams so that the controller pipeline can determine which ways to use when servicing the incoming memory requests. Alternatively or in addition, the cache 120 can maintain a quota for each portion and use hardware to count how much of the quota has been used.

The allocation engine can perform the allocation techniques described below using dedicated hardware circuitry of the cache 120. Alternatively or in addition, the allocation processes can be implemented in software and the allocation engine can cause a CPU of the host device to perform the allocation algorithm.

Figure 2:
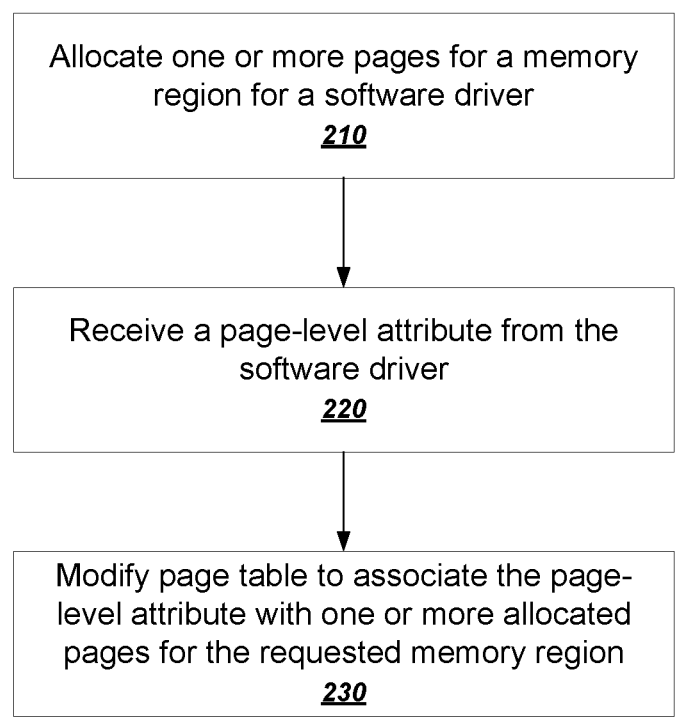
FIG. 2 is a flowchart of an example process for assigning page-level attribute values to allocated memory pages according to implementations of the present disclosure.

FIG. 2 is a flowchart of an example process for assigning page-level attribute values to allocated memory pages. The example process can be performed by any appropriate client device executing a particular software module capable of modifying page table entries. For example, the client device can execute a modified operating system that modifies page table entries according to different types of data streams. Alternatively or in addition, a client device can execute client application software that modifies page table entries according to different types of data streams. For convenience, the example process will be described as being performed by a client device, programmed appropriately in accordance with this specification.

The client device allocates one or more pages for a memory region for a software driver (210). The software driver is a software module executing on the client device. The client device can allocate the memory region before or after the software driver starts, or at some other point in the execution of the software driver in which new requests to allocate memory are executed.

The client device determines a page-level attribute for the one or more pages of the memory region (220). A modified OS of the client device can automatically distinguish different kinds of pages at memory allocation time. For example, the OS can distinguish between pages of instructions and pages of data.

Alternatively or in addition, the OS of the client device can support an application programming interface (API) that allows software drivers to assign a particular page-level attribute at memory allocation time. For example, the OS need not have any knowledge of the interpretation behind the values of the page-level attributes. Rather, the software drivers themselves can be programmed to assign the page-level attributes for particular use cases. For example, the software drivers can assign one page-level attribute for pages of instructions, a different page-level attribute to pages of data, and another page-level attribute for pages of page table data.

The client device modifies the page table to associate the page-level attribute with one or more allocated pages for the requested memory region (230). In other words, the client device stores in the page table an association between each allocated page and each assigned page-level attribute value.

Figure 3:
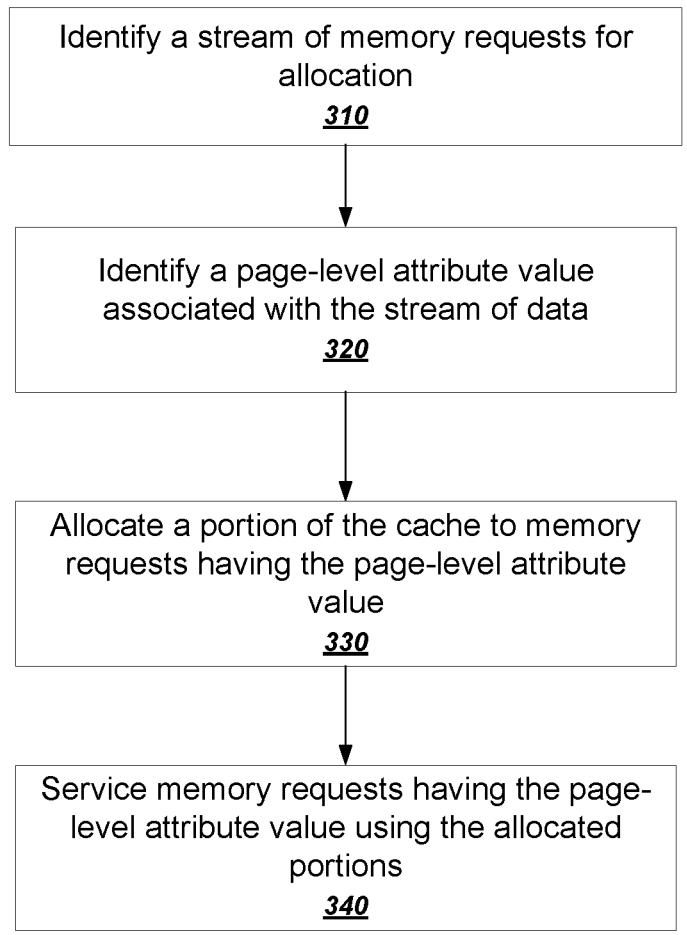
FIG. 3 is a flowchart of an example process for allocating ways of a cache, according to implementations of the present disclosure.

FIG. 3 is a flowchart of an example process for allocating ways of a cache. The example process can be performed by one or more components of a cache. The example process will be described as being performed by an allocation engine of a cache on an SOC, programmed appropriately in accordance with this specification.

The allocation engine identifies a stream of memory requests for allocation (310). The allocation engine can identify a stream in a number of ways. As described above, the cache can have configuration registers that are configured pre- or post-manufacture that specify attribute values or attribute patterns, and the allocation engine can interpret each attribute value or pattern as a separate stream that requires dedicated cache memory.

Alternatively or in addition, the cache can identify streams of memory requests by monitoring memory traffic. For example, the cache can maintain statistics on the most commonly seen values for page-level attributes in all memory requests and can allocate dedicated portions of the cache for the most commonly seen page-level attribute values.

A number of different events can trigger the cache to kick off the allocation process by identifying streams of memory requests. For example, the cache can kick off the allocation at boot time. As another example, the SOC can be configured to automatically generate a repartitioning trigger event when the SOC detects execution or usage changes. The trigger event can be a signal or data received through the system that indicates that the configuration registers have been modified and that the portions of the cache need to be reallocated.

The allocation engine identifies a page-level attribute value associated with the stream of data (320). As described above, each memory request can include a page descriptor generated from the address translation process, which can include a page-level attribute value.

A stream of memory requests can be associated with more than one page-level attribute value. For example, the configuration registers can also specify an association with a stream identifier. Thus, the cache can use the specified association in order to identify page-level attribute values for a stream, rather than merely the occurrence of the page-level attribute values in the configuration registers. In case of multiple page-level attribute values, cache can repeat (at least partly) the example process for each of the identified page-level attribute values. In addition, as described above the page-level attribute values can specify wildcard bits so that the cache effectively uses an attribute pattern.

The allocation engine allocates a portion of the cache to requests having the page-level attribute value (330). The attribution engine can allocate any appropriate portion of the cache, e.g., one or more lines, sets, ways, or some combination of these. In some implementations, the portions are exclusively allocated such that only memory requests having the specified page-level attribute value can use the allocated cache resources.

As described above, the allocation process can distinguish between different types of pages based on the page-level attribute values. For example, the allocation engine can distinguish streams of instructions from streams of data and can allocate one portion of the cache to streams of instructions and another portion of the cache to streams of data.

Additionally, the allocation engine can distinguish a first stream of instructions executed by a client device from a second stream of instructions executed by the same client device or a different second client device and can allocate different portions of the cache to different streams of instructions.

In addition, the allocation engine can distinguish between different types of data pages. For example, the allocation engine can allocate different portions of the cache to different data pages or pages belonging to different memory buffers. In some implementations, the allocation engine can give special priority to pages storing particular types of data structures and can allocate different amounts of cache resources to each. For example, one data buffer that has a substantial impact on caching utilization is the page table. Thus, the allocation engine can treat data buffers storing page table data differently from buffers storing other kinds of data. For example, the allocation engine can allocate 1 MB of cache memory for page table pages and 4 kb of cache memory to other kinds of data buffers.

The cache then services memory requests from client devices on the SOC based on the page-level attribute values in page descriptors of the requests (340). In doing so, the cache can effectively dedicate portions of the cache to different streams of memory requests.

Figure 4:
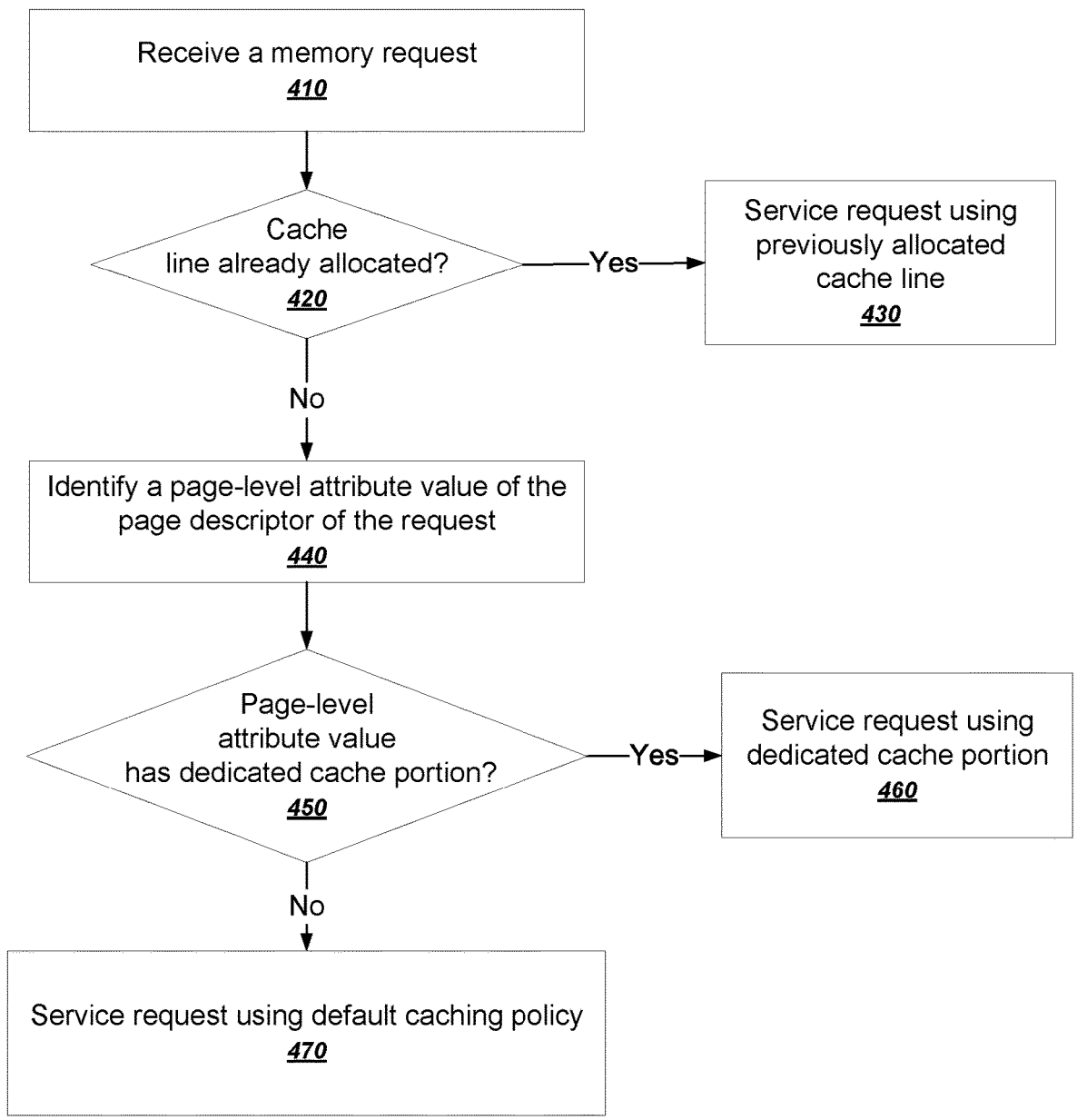
FIG. 4 is a flowchart of an example process for servicing a memory request using portions of the cache dedicated to streams of memory requests, according to implementations of the present disclosure.

FIG. 4 is a flowchart of an example process for servicing a memory request using portions of the cache dedicated to streams of memory requests. The example process can be performed by one or more components of a cache. The example process will be described as being performed by a cache on an SOC, e.g., the cache 120 of FIG. 1.

The cache receives a memory request (410). The memory request can be generated by an address translation unit of a particular client device, and can include a physical address and a page descriptor generated during the address translation process.

The cache determines whether a cache line has already been allocated for the request (420). In other words, the cache can bypass checking for page-level attributes entirely if a cache line has already been allocated for the request.

If a cache line has already been allocated for the request, the cache can service the request using the previously allocated cache line (branch to 430). Note that in this scenario, even if a particular stream of memory requests has a dedicated cache portion, the cache may service the memory request using a different portion if the request was previously cached in the different portion. In some implementations, in order to improve the hit rate of the cache, the system can move the cache line from the portion where it was previously allocated to the portion dedicated to that stream of memory requests.

If no cache line was allocated for the request (420) the cache identifies a page-level attribute value of the page descriptor associated with the memory request (440). The page descriptor may include one or more attributes of the translation process, e.g., an address of the page table associated with the memory request. The cache can identify a page-level attribute of the page descriptor that relates to the page to which the physical address belongs.

The cache determines whether the page-level attribute value has a dedicated cache portion (450). For example, the cache can compare the page-level attribute value to one or more attribute values stored in the configuration registers. In response to determining that the page-level attribute value has a dedicated cache portion, the cache services the memory request by using the dedicated cache portion (460). Otherwise, the cache services the memory request by using a default caching policy (470).

Accordingly, an cache can identify different streams of memory requests and allocate different portions of cache memory to respective streams based on their respective page-level attribute values. Additionally, the cache can use the page-level attribute values to assign different replacement policies to different streams of memory requests.

For example, the cache can allocate some portions of the cache memory to "write" instructions and some other portions of the cache memory to "read" instructions. For example, a portion of the cache memory can be tagged as WRITE and be allocated to data streams with write attributes, and a portion of the cache memory can be tagged as READ and be allocated to data streams with read attributes in order to reduce over fetching from a dynamic random-access memory (DRAM, e.g., the memory 140). If an incoming memory request includes a write attribute and the cache determines that the WRITE memory portion of the cache memory is dedicated to the write attribute of the request, the cache services the request by writing the data of the request into the WRITE portion of the cache memory. For example, the WRITE memory portion can be associated with a WRITE attribute value. The cache can compare page-level attribute value of the incoming memory request to the WRITE attribute value to determine whether the WRITE memory portion is dedicated to the incoming memory request. Similarly, if an incoming memory request includes a read attribute and the cache determines that the READ cache memory portion is dedicated to requests having the read attribute, the cache can fetch a line from the READ portion of the cache memory and does not need to forward the request to the memory controller.

In some implementations, the cache can be further refined to use the page-level attributes to increase the cache usage while also preventing over-fetching of data. For example, some client devices operate on compressed data, and the page-level attributes can be used to determine which pages are storing compressed data. For example, a GPU can be using frame buffer compression to read and write compressed frame buffer data. In these situations, the cache need not allocate a full cache line for reads and writes from the client device. Instead, the cache can allocate only a fraction of the cache line, depending on the level of compression being used. For example, if the compressed data is only half the size of a cache line, e.g., 32 bytes of 64 bytes, the cache can effectively allocate two different addresses in the same cache line. That is, if the page-level attribute of an incoming read request indicates that the page stores compressed data, the cache can perform a partial read and store the data in only half of the cache line. In some implementations, the cache manages dirty bits on a full cache line basis. Therefore, if either portion of the cache line is modified, the cache may need to perform a write of the full cache line to memory, even for the portion that is unmodified.

An cache can also convert a page-level attribute value of a request into a partition identifier (PID) for cache that use caching policies that are based on partition identifiers. In general, a partition is a portion of cache resources that are allocated for aching requests to a particular region of memory. In general, there is a correspondence between a partition and a region of memory that is used by one or more client devices that access the region of memory.

To perform the conversion, the cache can use the page-level attribute values and the identifier of the requesting device to look up a partition identifier for servicing the request. This provides a level of indirection between the page-level attribute and the actual allocation and replacement policy of the cache for those pages. This feature can be used to separate partitions for different buffers, e.g., for different CPU or GPU buffers as described above, on the bases of their page-level attributes.

In some implementations, the least significant bits of the partition identifier are substituted with one or more bits from the page-level attribute values. To support this feature, the client devices can be restricted to setting only the most significant bits of the partition identifier. For example, if the cache supports 64 memory partitions, then client devices can be limited enumerating only 32 partition identifiers.

The cache can also use page-level attributes to resolve partition naming conflicts across multiple client devices. If multiple client devices share the same buffer, e.g., in the producer/consumer context mentioned above, each client device may refer to the same cache partition by a different identifier. The page-level attributes can allow the cache to treat the buffer as a single partition.

To do so, the cache can use special function registers to maintain a mapping between a page-level attribute mask and a local partition identifier (PID) that is used only within the cache. Thus, when a request comes in, the cache can convert the page-level attribute into a local PID. The cache can then service the request using the local PID rather than the PID supplied by the client device. Therefore, when the cache services requests from two different client devices that refer to the same buffer with different PIDs, the cache will map the different external PIDs to the same local PID based on the page-level attributes of the buffer. The client devices may still be responsible for using the external PIDs to enable or disable the partition depending on the execution context of the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a hardware-implemented or software implemented input/output system that provides an output that is different from the input. An engine can be implemented in dedicated digital circuitry or as computer-readable instructions to be executed by a computing device. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a host device having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   one or more integrated client devices, each client device being configured to generate memory requests, each memory request having a respective physical address and a respective page-level attribute of a respective page of a first memory to which the physical address belongs; and
   a cache configured to cache memory requests to the first memory for each of the one or more integrated client devices,
   wherein the cache comprises a cache memory having multiple ways, the cache memory being separate from the first memory, and
   wherein the cache is configured to distinguish different memory requests using page-level attributes of physical pages in the first memory of the memory requests and to allocate different portions of the cache memory to different respective memory requests.

2. The system of claim 1, wherein each client device has a respective address translation module that is configured to convert a virtual address received from a software driver to a respective memory request having a respective physical address and a respective page descriptor, and wherein each client device is configured to update a page table to assign a particular page-level attribute value to a particular page.

3. The system of claim 2, wherein the cache is configured to distinguish different memory requests using particular page-level attributes of page descriptors generated by the respective address translation modules of the client devices.

4. The system of claim 3, wherein the address translation module is a memory management unit that is configured to perform a hardware walk of a page table in the first memory in order to perform address translation.

5. The system of claim 1, wherein the cache is configured to identify physical addresses occurring on different pages as being part of the same memory requests.

6. The system of claim 1, wherein a first page-level attribute is included in memory requests that are part of a first stream of instructions executed by a client device, and a second page-level attribute different from the first page-level attribute is included in memory requests that are part of a second stream of data used by the client device, and
   wherein the cache is configured to distinguish the first stream of instructions from the second stream of data based on the first and the second page-level attributes to allocate a first portion of the cache memory to the first stream of instructions and a second portion of the cache memory to the second stream of data.

7. The system of claim 1, wherein a first page-level attribute is included in memory requests that are part of a first stream of instructions executed by a first client device, and a second page-level attribute different from the first page-level attribute is included in memory requests that are part of a second stream of instructions executed by the first client device or a different second client device, and
   wherein the cache is configured to distinguish the first stream of instructions from the second stream of instructions based on the first and the second page-level attributes to allocate a first portion of the cache memory to the first stream of instructions and a second portion of the cache memory to the second stream of instructions.

8. The system of claim 1, wherein a first page-level attribute is included in memory requests that are part of a first stream of data written to a first data buffer, and a second page-level attribute different from the first page-level attribute is included in memory requests that are part of a second stream of data written to a second data buffer, and
   wherein the cache is configured to distinguish the first stream of data from the second stream of data based on the first and the second page-level attributes to allocate a first portion of the cache memory to the first stream of data and a second portion of the cache memory to the second stream of data based on respective first and second page-level attributes included in the respective first and second streams.

9. The system of claim 8, wherein the cache is configured to use the page-level attributes to allocate more cache memory to data buffers storing page table data than to data buffers storing non-page-table data.

10. The system of claim 1, wherein the cache is configured to assign different replacement policies to different memory requests based on the respective page-level attributes of the memory requests.

11. The system of claim 10, wherein the cache is configured to identify a first stream of data written by a producer process executing on one of the one or more client devices, wherein the first stream of data written by the producer process is consumed by a consumer process executing on one of the one or more of client devices,
    wherein the cache is configured to allocate a first portion of the cache memory to the first stream of data written by the producer process.

12. The system of claim 11, wherein the cache is configured to invalidate cache entries in the first portion of cache memory whenever a cache entry is read by the consumer process.

13. The system of claim 1, wherein the cache is configured to:
    determine that a page-level attribute of a read request indicates that a particular page uses compressed data, and
    in response, reading less than all of a full cache line from memory in order to fulfill the read request.

14. The system of claim 1, wherein the cache is configured to map a page-level attribute value to a particular partition identifier, and thereby associating the particular partition identifier with multiple different pages in the first memory.

15. A computer-implemented method executed by a computing system, the method comprising:
    receiving, by the system, one or more memory requests generated by respective ones of one or more client devices, each memory request having a respective physical address and a respective page-level attribute of a respective page of a first memory to which the physical address belongs; and caching, by a cache of the system, the memory requests to the first memory in a cache memory by:

distinguishing different memory requests using page-level attributes of physical pages in the first memory of the memory requests, and allocating different portions of the cache memory to different respective memory requests.

16. The method of claim 15, wherein a first page-level attribute is included in memory requests that are part of a first stream of instructions executed by a client device, and a second page-level attribute is included in memory requests that are part of a second stream of data used by the client device, wherein distinguishing different memory requests comprises distinguishing the first stream of instructions from the second stream of data based on the first and the second page-level attributes to allocate, and wherein a first portion of the cache memory is allocated to the first stream of instructions and a second portion of the cache memory to the second stream of data.

17. The method of claim 15, wherein a first page-level attribute is included in memory requests that are part of a first stream of instructions executed by a first client device, and a second page-level attribute different from the first page-level attribute is included in memory requests that are part of a second stream of instructions executed by the first client device or a different second client device, wherein distinguishing different memory requests comprises distinguishing the first stream of instructions from the second stream of instructions based on the first and the second page-level attributes to allocate, and wherein a first portion of the cache memory is allocated to the first stream of instructions and a second portion of the cache memory to the second stream of instructions.

18. The method of claim 15, wherein a first page-level attribute is included in memory requests that are part of a first stream of data written to a first data buffer, and a second page-level attribute is included in memory requests that are part of a second stream of data written to a second data buffer, wherein distinguishing different memory requests comprises distinguishing the first stream of data from the second stream of data based on the first and the second page-level attributes to allocate, and wherein a first portion of the cache memory is allocated to the first stream of data and a second portion of the cache memory to the second stream of data.

19. The method of claim 15, further comprising identifying a first stream of data written by a producer process executing on one of the one or more client devices, wherein the first stream of data written by the producer process is consumed by a consumer process executing on one of the one or more client devices, wherein the cache is configured to allocate a first portion of the cache memory to the first stream of data written by the producer process.

20. The method of claim 15, further comprising:

determining that a page-level attribute of a read request indicates that a particular page uses compressed data, and in response, reading less than all of a full cache line from memory in order to fulfill the read request.

* * * * *